United States Patent [19]
Bieber

[11] 3,728,908
[45] Apr. 24, 1973

[54] DUAL-MODE SHIFTER FOR AUTOMATIC TRANSMISSIONS

[76] Inventor: William J. Bieber, R.D. No. 1, Pipersville, Pa. 18947

[22] Filed: Nov. 3, 1971

[21] Appl. No.: 195,149

[52] U.S. Cl. ..............................................74/473 R
[51] Int. Cl. ...............................................G05g 7/08
[58] Field of Search ..................74/473 R, 475, 476, 74/477

[56] References Cited

UNITED STATES PATENTS

| | | | |
|---|---|---|---|
| 3,465,612 | 9/1969 | Letwin et al. | 74/473 R |
| 3,665,775 | 10/1972 | Freeman | 74/473 R |

Primary Examiner—Milton Kaufman
Attorney—Dexter N. Shaw et al.

[57] ABSTRACT

An automatic transmission having a shift arm which pivots to shift the transmission into various speed ranges is provided with apparatus for pivoting the arm accurately and rapidly and in increments upon repeated sequential displacement of a master shift lever in one direction. One end of the shift arm of the transmission is connected to a primary shift lever through an indexing assembly, and the other end of the shift arm is connected to a secondary shift lever. The master lever is selectively coupled with either the primary or the secondary shift lever; when coupled with the secondary lever the master lever shifts the transmission in the conventional mode; when coupled with the primary lever the master lever shifts the transmission in a rapid shift or racing mode. The indexing assembly includes a housing which slidably mounts a slide element connected to the shift arm and a pawl mounted in a carriage which slides alongside the slide element for gripping the slide element and displacing it longitudinally to pivot the arm. The pawl is connected through linkage to the primary lever and sequentially engages recesses in the slide element to move with the slide and carriage predetermined distances when the master lever is pivoted in one direction. Stop means is provided in the housing to arrest movement of the slide element upon completion of a shift. The master lever is normally biased into an initial position by means of a spring which also operates to disengage the pawl from the slide element in preparation for a succeeding shift.

18 Claims, 6 Drawing Figures

DUAL-MODE SHIFTER FOR AUTOMATIC TRANSMISSIONS

The present invention relates to shifters, and more particularly, the present invention relates to shifters for use with automatic automobile transmissions to effect rapid shifting of the transmission into increasing speed ranges, such as during racing.

At present, shifters are available for effecting rapid changes in the gear ratios of an automobile transmission upon actuation of a shift lever. An example of such a shifter which is useful in conjunction with a conventional manual transmission is disclosed in my U.S. Pat. No. 3,456,522. Another example of a shifter of this type is disclosed in my U.S. Pat. No. 3,636,793. Although each of these shifters operates satisfactorily when used with a manual transmission, they are not capable of being employed satisfactorily to shift an automatic transmission.

Examples of shifters capable of being used with automatic transmissions are disclosed in U.S. Pat. Nos. 3,570,320 and RE 26,884. These shifters operate to prevent inadvertent overshifting or undershifting of the transmission into undesired ranges while the shift lever is being operated rapidly by a driver during racing. Such inadvertent improper shifting is to be avoided because of the possibility of damaging the automatic transmission. Although these shifters may operate satisfactorily, neither is of such simple but rugged construction as to be capable of being manufactured by low cost, mass production techniques.

With the foregoing in mind, it is the primary object of the present invention to provide for automatic transmissions a shifter which is capable of shifting the transmission in the customary manner and which is capable of shifting the transmission rapidly when placed in a rapid shift or racing mode.

It is another object of the present invention to provide an automatic transmission shifter which operates to shift the transmission into increasing speed ranges upon sequential displacement of a master shift lever in a single direction.

It is a further object of the present invention to provide a shifter having primary and secondary shift levers which are connected to a shift arm on a transmission and which are selectively coupled to a master shift lever, and wherein the primary lever is connected to the shift arm through an indexing assembly operable to pivot the shift arm only in one direction when the master lever is coupled with the primary lever and pivoted.

As a still further object, the present invention provides an automatic transmission shifter which prevents shifting of the transmission into reverse during rapid upshifting of the transmission and which prevents shifting of the transmission into a speed range other than the one into which it was last shifted by the master lever during uncoupling of the master lever from the primary shift lever and coupling with the secondary lever.

More specifically, the present invention provides a shifter for use with an automatic automobile transmission to shift the transmission in either a conventional mode or a racing mode where rapid upshifting capabilities are required. The shifter comprises a primary shift lever which is coupled through an indexing assembly to one end of a pivotable shift arm on a transmission by linkage and a secondary shift lever which is coupled by a linkage to the other end of the shift arm. A master shift lever is mounted in a frame to pivot relative to the shift levers and is selectively coupled to either shift lever by means of a selector. The selector includes a pin biased into a recess in the upper end of the primary and secondary shift levers and an operator on the master shift lever for engaging and disengaging the pin from the recesses. The indexing assembly includes a slide element connected to the shift arm and having a series of recesses corresponding to forward transmission speed ranges. A carriage is mounted to slide alongside the slide element in a housing, a pawl is pivotally mounted in the carriage and is connected through a linkage to the primary shift lever. Stop means is provided to limit the movement of the carriage, and hence, the slide in the housing upon completion of a shift. There is provided means to bias the pawl out of engagement with the recesses and the primary lever into a ready position. Also provided is a means for preventing inertia forces on the slide element from disengaging the pawl from the slide element and a means for preventing the shifter from shifting the transmission into reverse when in the racing mode. When the master lever is coupled by the selector pin to the primary lever, pivotal movement of the master lever in one direction causes the pawl to pivot and engage in one of the recesses in the slide for displacing the slide longitudinally and the carriage against the stop to pivot the shift arm a sufficient distance to upshift the transmission into an increased speed range. The pawl disengages the slide and the master lever returns to a ready position when released. When the master lever is coupled to the secondary shift lever, the slide element slides freely in the housing as the master lever is pivoted to shift the transmission in the conventional mode and into reverse and park positions.

These and other objects, features and advantages of the present invention should become apparent from the following description when taken in conjunction with the accompanying drawings, in which.

Figure 1:
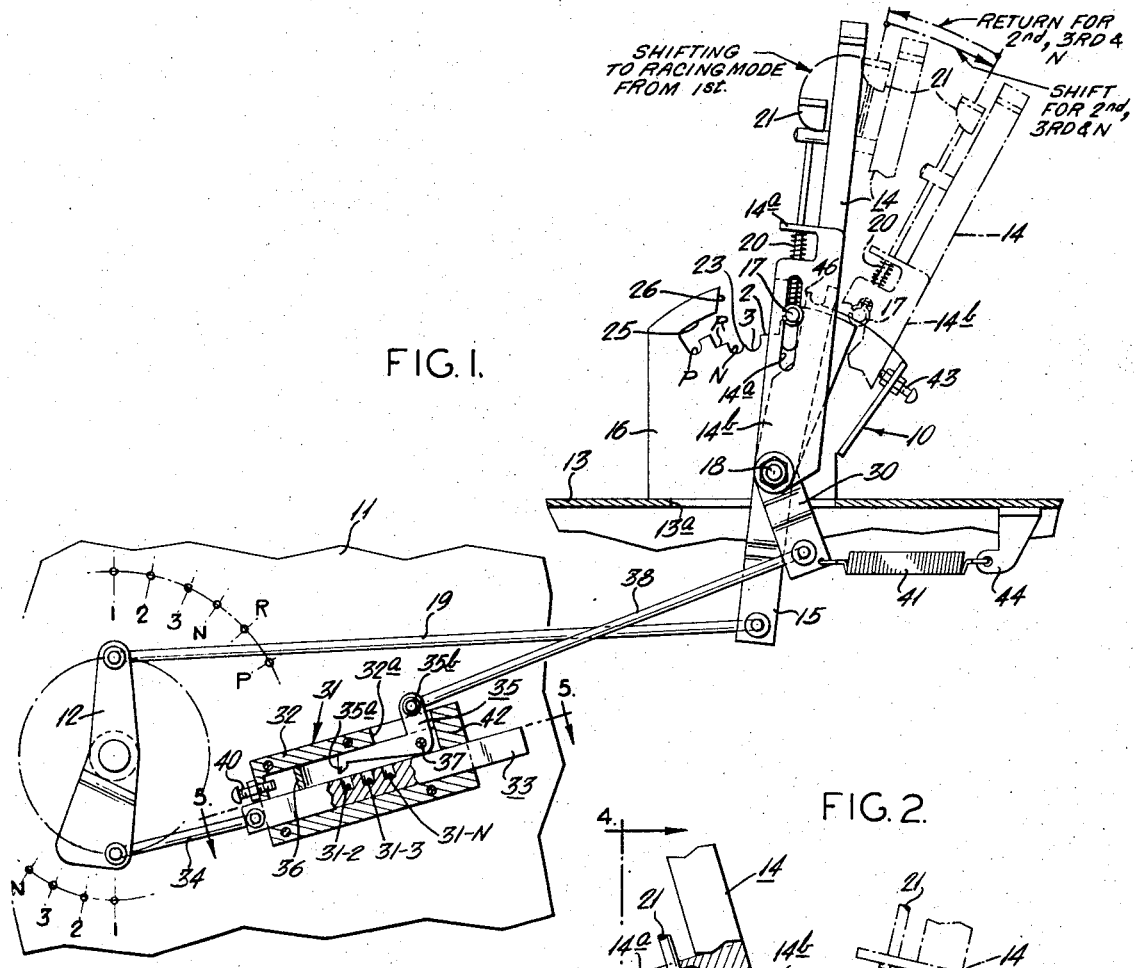
FIG. 1 is a side elevational view of a shifter embodying the present invention.

Referring now to the drawings, there is illustrated in FIG. 1 dual mode shifting apparatus 10 for use with a conventional automatic automobile transmission 11. The transmission 11 has a shift arm 12 which is normally located alongside the transmission housing and which pivots on a horizontal axis and in both the clockwise and counterclockwise directions to change the output speed ranges of the transmission. In the present instance, the shift arm 12 is illustrated in a position corresponding to the first or low range of the transmission, and pivotal movement of the shift arm in the increments in the clockwise direction about its axis shifts the transmission through intermediate second, third, and neutral ranges and into a reverse and a park position. These positions are indicated in an arc around the pivot axis of the shaft 12. Although the shift arm 12 in the illustrated embodiment is disposed substantially vertically when the transmission 11 is in the first range position, it should be understood that the disposition of the shift lever for any given speed range does not affect the operability of the shifter 10. In some circumstances, it is preferable for the shift arm to be disposed vertically when in the neutral range so that shifting of the transmission occurs when the arm 12 is pivoted in either direction from the vertical. Preferably, the shift arm 12 is releasably fastened to its pivot shift to permit its adjustment into any desired position for any given transmission setting.

The third position corresponds to the drive range of the transmission, and when the shift arm 12 is placed in that position before accelerating, the transmission upshifts automatically through first and second ranges. It is noted, however, that when the shift arm 12 is placed in either the second or third ranges, the transmission is locked in those ranges and will not automatically upshift. Hence, this type of automatic transmission is particularly suited for competition driving where it is desirable for the driver of the automobile to be able to shift the transmission at will from first through third ranges in response to engine speed, vehicle acceleration or like indicia of performance.

Figure 4:
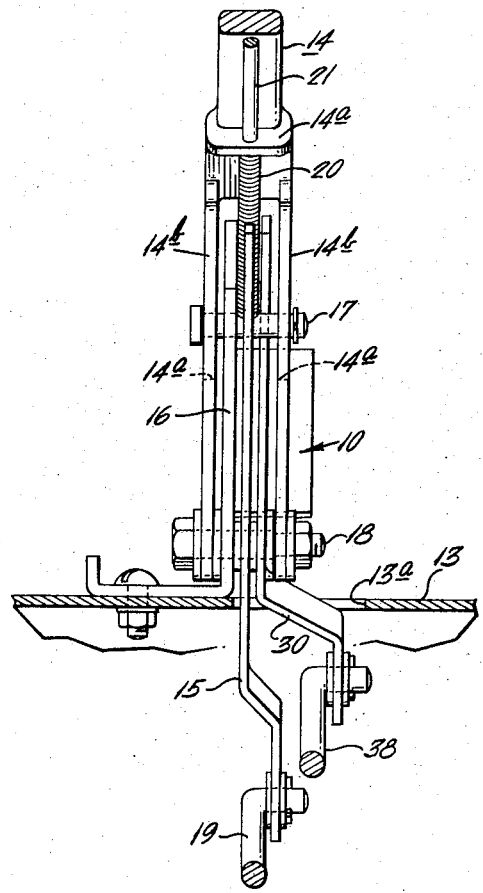
FIG. 4 is a sectional view taken along line 4—4 of FIG. 2.

For the purpose of pivoting the shift arm 12, the shifting apparatus 10 is mounted to the floor 13 of an automobile in the driver's compartment. In the illustrated embodiment, the shift apparatus 10 comprises a master shift lever 14 and a secondary shift lever 15 both mounted to pivot on a common axis in a plate-like frame 16 bolted or otherwise secured to the floor 13 (see FIG. 4). The master shift lever 14 is coupled to the secondary shift lever 15 by means of a selector pin 17 which extends transversely to the pivot planes of the shift levers 14 and 15 and which slides in elongated slots 14a, 14a extending radially outward from the pivot axis of the master lever 14 in bifurcations 14b, 14b on the lower end of the master lever 14. As best seen in FIG. 4, the bifurcations 14b and 14b straddle the secondary lever 15 and the frame 16, and the common pivot axis for both the master lever 14 and the secondary lever 15 is provided by means of a shouldered bolt 18.

In order to couple the master shift lever 14 with the secondary lever 15 by means of the selector pin 17, an upwardly open recess 15a is provided in the upper end of the secondary lever 15 for receiving the selector pin 17. In order to connect the secondary lever 15 to the transmission shift arm 12, an elongated link 19 is connected to and between the lower end of the lever 15 and the upper end of the arm 12. Thus, when the master lever 14 is coupled by means of the selector pin 17 to the secondary lever 15 and the master lever is pivoted in the counterclockwise direction from the position illustrated in FIG. 1, the transmission is shifted from first through neutral and into reverse and park ranges.

In order to provide a means for indicating the speed range in which the transmission has been placed by the master shift lever 14, the frame 16 is planar and is provided with an irregular outline defining a series of positioning surfaces P, R, N, 3, 2 and 1 (FIGS. 2 and 3) for engaging the selector pin 17 and securing the master lever 14 in selected angular positions corresponding to the various ranges. The selector pin 17 is biased into engagement with the surfaces by means of an elastic element, such as a compression spring 20, which is carried by the master lever 14 and which extends between a forward protrusion 14a thereon and the selector pin 17. An operating trigger 21 is mounted on the master lever 14 and extends through the spring 20 and is connected to the selector pin 17 for displacing the pin 17 against its bias to engage the pin 17 with the various positioning surfaces. In the illustrated embodiment, the surfaces N and 3 are upwardly concave and are separated by a cusp 23 so that when the master lever 14 is shifted between these positions, the selector pin 17 is cammed against its bias as it traverses the cusp 23. The surfaces 1 and 2 are each located at different elevations with respect to the surfaces N and 3. Thus, in order to shift from the neutral or third range and to the first and second ranges, the pin 17 must be displaced upwardly against its bias by the trigger 21 while the master lever 14 is being pivoted in a clockwise direction. Shifting from the neutral range and into reverse range is similarly effected when the trigger 21 is raised and the master lever 14 is pivoted in the counterclockwise direction.

Figure 2:
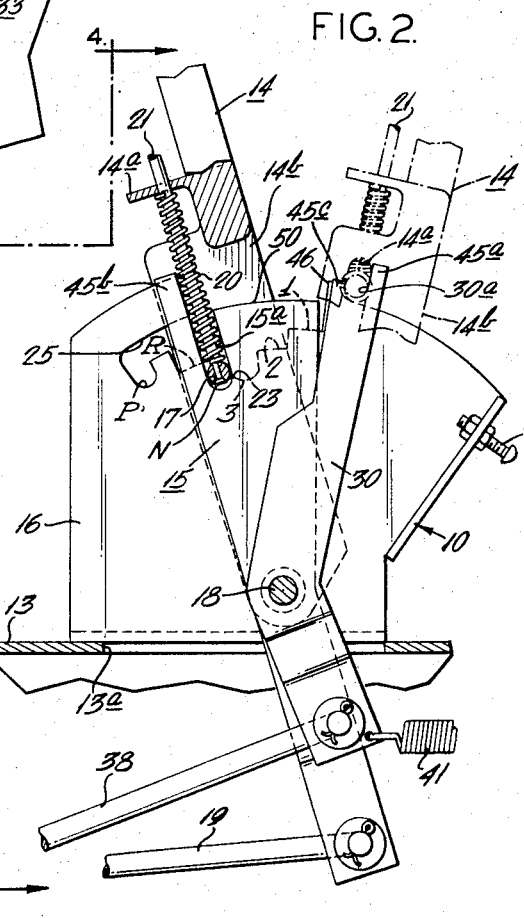
FIG. 2 is an enlarged fragmentary view of the shifter illustrated in FIG. 1.
Figure 3:
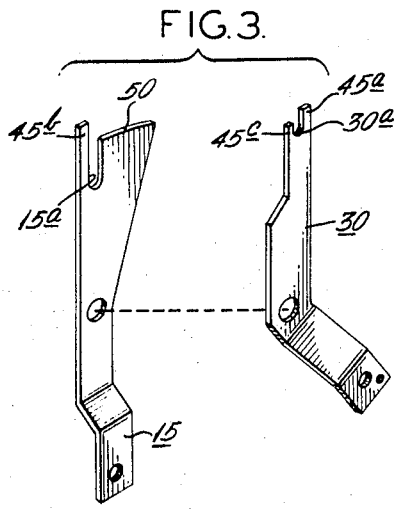
FIG. 3 is an exploded perspective view of a primary and secondary shift lever employed in the shifter of FIGS. 1 and 2.

As best seen in FIG. 2, the latching surface P corresponding to the park position is provided in the frame 16 forwardly of the reverse range surface R, and a slot 25 is provided in the frame 16 for permitting the selector pin 17 to be displaced into engagement with the P surface and latched. A camming surface 26 is also provided on the frame 16 and inclined with respect to the slot 25 to cam the selector pin 17 into the park latching position when the trigger 21 is held in its uppermost limit position while the master shift lever 14 is pivoted forwardly or counterclockwise (FIG. 1). Preferably, a pointer (not shown) is provided on the secondary lever 14 to cooperate with indicia located on a shift console inside the driver's compartment to provide a visual indication of the speed range in which the transmission is placed.

As described thus far, the shifting apparatus operates in an essentially conventional manner. Hence, when the driver desires the transmission to shift automatically, he places it in the third or drive position. However, when the driver wants to shift the transmission manually from first through third forward speed ranges, he raises the trigger 21 and pivots the master shift lever 14 rearwardly into the full line position indicated in FIG. 1. In this position, the selector pin 17 engages the surface 1 on the frame 16. The transmission is shifted into the second speed range when the master shift lever 14 is displaced forwardly a slight distance to cause the selector pin 17 to engage the surface 2. The transmission is shifted into third and neutral ranges in a similar manner.

During competition driving, it is difficult for the driver to displace the master shift lever 14 the slight distance required to shift the transmission while steering the automobile. Thus, there exists the possibility of his inadvertently shifting the transmission into undesired speed ranges. For instance, it is not uncommon for the driver to displace the shift lever 14 too great a distance to cause the transmission to overshift from first range to third or neutral. In such event, the missed shift would probably cause the driver to lose the competition event and possibly damage the transmission. Also, in certain shifters, it is possible for the driver to undershift and thereby damage the transmission.

The foregoing disadvantages of conventional shifters are completely eliminated by the present invention, which provides a shifter which is capable of operating in either the conventional mode or in a rapid shift or racing mode. When in the racing mode, the shifter of the present invention is designed to displace the shift arm 12 of the transmission 11 accurately from the first range and into the second, third and neutral ranges upon sequential operation of the master shift lever 14 in only one direction.

To this end, a primary shift lever 30 is associated with the master shift lever 14 and the secondary shift lever 15, and the primary lever 30 is connected through an indexing assembly 31 to the lower end of the transmission shift arm 12. As best seen in FIGS. 1 and 2, the primary lever 30 is mounted to the frame 16 to pivot coaxially with the other shift levers 14 and 15. As illustrated in FIG. 4, both the primary lever 30 and the secondary lever 15 depend through an aperture 13a in the floor 13 of the automobile, and the lower end of each lever 30 and 15 is laterally offset so that each is aligned properly with the shift arm 12 on the transmission. Like the secondary shift lever 15, the primary shift lever 30 has an upwardly open recess 30a at its upper end (FIG. 3) for receiving the selector pin 17 to couple the master lever 14 therewith. When so coupled, pivotal movement of the master lever 14 rearwardly between its initial position (illustrated partially in broken lines in FIG. 1) and its terminal position (illustrated substantially in broken lines therein) causes the indexing assembly 31 to actuate the shift arm 12 and to displace the arm 12 in increments in the clockwise direction upon repeated pivotal movement of the master lever 14 in the rearward direction. Upshifting occurs when the master lever 14 is pulled fully rearward or rightward as illustrated in FIG. 1.

Figure 5:
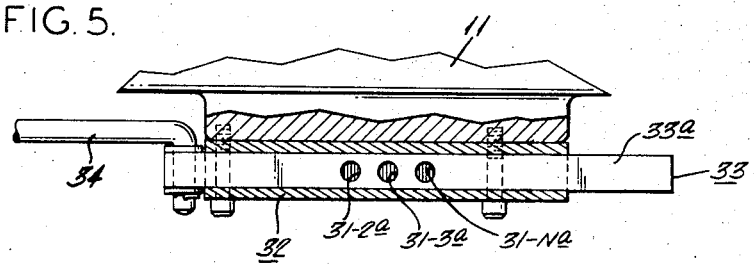
FIG. 5 is a sectional view taken along line 5—5 of FIG. 1.

As best seen in FIGS. 1 and 5, the indexing assembly 31 comprises a housing 32 which is mounted to the transmission 11 in proximity to the shift arm 12. An elongated slide element 33 having a rectangular cross-section is mounted to slide longitudinally in the housing 32, and the ends of the slide element 33 extend out of the housing 32. The left end of the slide element 33 is pivotally connected by means of a link 34 to the lower end of the shift arm 12 and to the side of the pivot axis opposite the connected other end.

In order to displace the slide element 33 longitudinally in its housing 32, gripping means is provided and is connected to the primary shift lever 30. In the illustrated embodiment, the gripping means includes a series of recesses 31-2, 31-3, and 31-N, which are spaced apart in the upper surface of the slide element 33 and which correspond to the intermediate transmission speed ranges, second, third and neutral, respectively. The recesses are selectively engaged by means of a pawl 35 which is pivotally mounted in a carriage 36 mounted in the housing 32 to slide above and alongside the slide element 33. As may be seen in FIG. 6, the carriage is U-shaped in plan and mounts the pawl 35 by means of a pivot pin 37. The pawl 35 has a nose portion 35a which extends forwardly or toward the shift arm 12 from the pivot pin 37 for engaging in the recesses in the slide element 33, and the pawl 35 has an upstanding portion 35b which projects upwardly at a substantially right angle with respect to the nose portion 35a and through a slot 32a in the housing 32. The upper end of the upstanding portion 35 b of the pawl 35 is coupled to the lower end of the primary shift lever 30 by means of a connecting link 38. As illustrated in FIG. 1, the connecting link 38 extends substantially parallel to the path of movement of the slide element 33. Thus, when the master lever 14 is coupled with the primary shift lever 30 by the selector pin 17 and is pivoted rearwardly from its initial position, the link 38 moves longitudinally to pivot the nose 35a of the pawl 35 downwardly into the recess 31-2 which is underlying registry therewith. Further rearward movement of the master lever 14 displaces the slide 33 forwardly to operate through the connecting link 34 to pivot the shift arm 12.

In order to limit the displacement of the slide element 33 and to arrest its motion when the shift from first to second range is completed, stopping means is provided. In the present invention, the stopping means includes a threaded element 40 which is mounted in the housing 32 in the path of movement of the carriage 36 to engage the carriage 36 when it has traveled a predetermined distance in the housing 32. Thus, when the pawl 35 is engaged with the slide element 33 forward motion of the slide element 33 is arrested when the carriage 36 strikes the stop 40.

Figure 6:
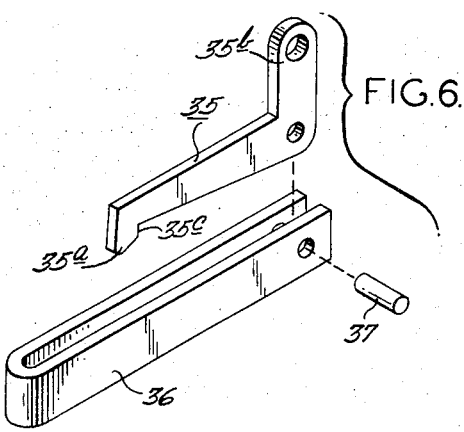
FIG. 6 is an exploded perspective view of a pawl and carriage assembly which is illustrated in section in FIG. 1.

In the course of shifting in the racing mode, the slide element 33 is accelerated rapidly and is decelerated rapidly when the carriage 36 strikes the stop 40. Inertia forces on the slide element 33 are ultimately resisted by the pawl 35, and in order to prevent disengagement of the pawl 35 from the slide element 33, surface means is provided on the slide element 33 and the nose 35a of the pawl 35. As best seen in FIGS. 1, 5 and 6, the surface means includes an internal surface 31-2a, 31-3a, and 31-Na in each recess disposed normal to the path of movement of the slide element 33. A complementary surface 35c is provided on the rearward face of the depending part of the nose portion 35a of the pawl 35. The surfaces in the recesses matingly engage the surface 35c of the pawl 35 and operate to prevent inertia forces from causing the pawl 35 to disengage the slide element 33 when forward motion of the slide element 33 is arrested by the stop 40. As a result, possible overshifting of the transmission, which may otherwise occur, is prevented.

At the completion of a shift, for instance, from first to second range, the pawl 35 is disengaged from the slide element 33 and the master shift lever 14 is returned to its initial position (see FIG. 1). For this purpose, means is provided to bias the nose 35a of the pawl 35 out of engagement with the slide element 33 and to bias the master shift lever 14 into its initial position. In the illustrated embodiment, the required biasing action is provided by means of an extension spring 41 which is connected to the lower end of the primary shift lever 30 and to a hook 44 on the underside of the floor 13. The extension spring 41 thus biases the master shift lever 14 and the primary shift lever 30 counterclockwise and the pawl 35 clockwise to cause the pawl 35 to disengage the slide element 33 at the completion of a shift. Moreover, the spring 41 operates to return the pawl 35 and its carriage 36 to a home position, as illustrated in FIG. 1, for re-engagement with another recess upon initiation of the next upshift. The top of the nose portion 35a of the pawl 35 slides on the inside of the top of the housing 32 to ensure that the bottom thereof is clear of the slide 33. Rearward movement of the pawl 35 and its carriage 36 in the housing 32 is limited by means of a stop 42 which is provided by an endwall of the housing 32 and which is spaced from the stop 40 and located in the path of movement of the carriage 36.

A supplemental adjustable stop 43 (FIG. 1) is provided on the frame 16 to engage the master shift lever 14 when displaced into its terminal position. The supplemental stop 43 is adjusted to engage the master shift lever 14 substantially simultaneously with the engagement of the carriage 36 with its forward stop 40. Thus, loads on each stop 40 and 43 are divided, and possible bending of the connecting link 38 is prevented.

For the purpose of preventing the slide element 33 from displacing the shift arm 12 of the transmission 11 into the reverse range position R upon repeated pivotal movement of the master shift lever 14, the slide element 33 is provided with a substantially smooth surface 33a confronting the nose 35a of the pawl and extending rearwardly, or rightward in FIG. 1, away from the last recess 31-N in the series. Thus, when the shift arm 12 is pivoted into its neutral position, the recess 31-N is located adjacent the stop 40, and further actuation of the master shift lever 14 causes the nose 35a of the pawl 35 to engage the smooth surface 33a and to slide thereon without gripping the slide element 33. As a result, it is not possible for the shift arm 12 to be pivoted into its reverse range position while the shifter 10 is in its racing mode.

The shifter 10 is capable of being placed readily in either the conventional or racing modes. To this end, as best seen in FIG. 2, the primary and secondary shift levers 15 and 30 are angulated with respect to one another to cause their recesses 15a and 30a, respectively, to be spaced one from the other, with the recess 30a in the primary shift lever 30 being located rearwardly of the recess 15a in the secondary shift lever 15. The master shift lever 14 is coupled with and uncoupled from the primary and secondary shift levers 30 and 15, respectively, when the trigger 21 is displaced upwardly to engage the selector pin 17 at the upper terminus of the slots 14a, 14a in the bifurcations 14b, 14b, and the master shift lever 14 is pivoted forwardly or rearwardly relative to the primary and secondary shift levers.

In order to prevent the selector pin 17 from improperly engaging the primary and secondary shift levers, for example, to prevent the selector pin 17 from engaging behind the primary shift lever 30, the shift levers have extensions or spurs 45a and 45b which project upwardly beyond the recess 30a and 15a, respectively, and substantially radially outward from the pivot axis of the master lever 14. Each extension 45a and 45b terminates at a location corresponding substantially to the upper terminii of the slots 14a, 14a in the master lever (see FIG. 2). With this structure, the extensions 45a and 45b prevent the selector pin 17 from being engaged behind the primary lever 30 or ahead of the secondary lever 15 during uncoupling and coupling of the master shift lever 14 therewith.

For the purpose of cooperating with the rear stop 42 to arrest movement of the master lever 14 when returning to its initial position under the influence of the biasing spring 41, an upstanding abutment 46 is provided on the frame 16 rearwardly adjacent the first range positioning surface 1. The abutment 46 is located in the path of movement of the selector pin 17 when engaged in its recess 30a in the primary shift lever 30. As best seen in FIG. 2, the abutment 46 terminates outwardly of the pivot axis of the shift levers at a location which is in substantial registry with the terminus of a companion extension 45c which is spaced from the extension 45a and defines the recess 30a therebetween. The distance between the terminus of the abutment 46 and the terminii of the slots 14a, 14a is sized to permit passage of the selector pin 17 into the recess 30a when the trigger 21 is held upwardly in its upper limit position and the master shift lever 14 is pulled rearwardly. Thus, when the primary shift lever 30 is coupled with the master lever 14 and the master lever 14 is released by the driver after completing an upshift, the spring 41 pivots the master lever 14 forwardly until the selector pin 17 engages the abutment 46 and the pawl carriage 36 substantially simultaneously engages its rear stop 42. With this structure, impact loads on the stop 42 and the abutment 46 are divided.

It may be desirable on occasions, when the shifter 14 is in its racing mode, for the driver to change to the conventional mode after having made one or more upshifts. For instance, if the driver were to upshift from first to second ranges and then decide to change the shifter 10 to operate it in its conventional mode, it is essential that some means be provided to ensure that the recess 15a in the secondary shift lever 15 be in the proper location to receive the selector pin 17 when the transition between modes is occurring. In the present invention, the secondary shift lever 15 moves in synchronism with the movement of the primary shift lever 30 and the shift arm 12 through the interconnection of the rigid link 19 with the shift arm 12. However, the slide element 33 slides freely in the housing 32 when the shift arm 12 is being pivoted upon movement of the secondary shift lever 15 when coupled with the master lever 14 in the conventional mode.

In order to ensure that the selector pin 17 does not engage behind the secondary lever 15 during the transition, a guard surface 50 is provided on the secondary lever 15. As best seen in FIG. 2, the guard surface 50 (FIG. 2) is located outwardly of the pivot axis of the levers a radial distance greater than the corresponding distances of the positioning surfaces R, N, 3, 2 and 1. The guard surface 50 extends rearwardly in an arc away from the recess 15a to terminate adjacent the companion extension 45c on the primary shift lever 30. with this structure, the guard surface 50 prevents the selector pin 17 from engaging any of the position surfaces behind the secondary lever 15 and possibly causing the driver to shift inadvertently into an undesired speed range.

In use in the conventional mode, the selector pin 17 couples the master lever 14 with the secondary lever 15, and displacement of the master lever 14 forwardly from its full line position in FIG. 1 causes the transmission to upshift from first through third and into neutral ranges when the master lever is simply pushed forwardly. The transmission is shifted into park, reverse and second or first ranges when the trigger 21 is held upwardly and the master lever 14 is pivoted in the proper direction.

When it is desired to place the shifter 10 in the racing mode for competition driving, the trigger 21 is held in its upper limit position and the master lever 14 is pulled rearwardly until the driver feels the selector pin 17 engage the extension 45a on the primary lever 30. Preferably, the transition takes place after the transmission has been placed in its first range position while in the conventional mode. The trigger 21 is then released and the spring 20 biases the pin 17 into the recess 30a. The shifter is ready for rapid shifting.

Rapid upshifting from first to second occurs when the master lever 14 is pulled rearwardly and released (see FIG. 1). This causes the pawl 35 to engage the slide element 33 and to displace the slide element 33 longitudinally in the housing to pivot the shift arm 12 clockwise. When the master lever 14 is released, the spring 41 causes the pawl to disengage the slide element 33 and pivots the master lever 14 to its initial position. Thus, the pawl 35 is returned to its home position, as illustrated in FIG. 1, for re-engaging the slide element 33 for succeeding upshifts. The transmission 11 may be shifted upwardly in this manner until the transmission has been placed in the neutral range. As noted heretofore, the shifter may be returned to the conventional mode at any time; however, it is preferable to make the transition when the transmission is in neutral after rapidly upshifting and while the automobile is moving at a relatively high speed.

In view of the foregoing, it should be apparent that the present invention provides a novel shifter for use with automatic transmissions to upshift the transmission rapidly when in a racing mode or to shift the transmission in the customary manner when in a conventional mode.

While a preferred embodiment of the present invention has been described in detail, various modifications, alterations and changes may be made without departing from the spirit and scope of the present invention as defined in the appended claims.

I claim:

1. Transmission shifting apparatus, comprising a shift arm pivotable on an axis between at least two positions corresponding to different transmission output speed ranges, means for displacing said shift arm from one position to the other, including: a primary shift lever mounted to pivot between initial and terminal positions on another axis; and indexing means cooperable with said primary shift lever and said shift arm to pivot said arm in one direction from one position to the other upon pivotal movement of said primary shift lever, said indexing means including a slide element; means connecting said slide element to said shift arm to cause said shift arm to pivot upon displacement of said slide element; gripping means connected to said shift lever and engageable with said slide element upon pivotal movement of said shift lever in one direction about its axis and from its initial position for displacing said slide element; stop means associated with said gripping means to limit displacement of said gripping means and said slide engaged therewith upon continued pivotal movement of said shift lever in said one direction toward its terminal position; and biasing means for pivoting said shift lever in the opposite direction toward its initial position and about its axis to enable said gripping means to disengage said slide and to return said gripping means to a home position for re-engagement with said slide upon pivotal movement of said shift lever again from its initial position.

2. Apparatus according to claim 1 wherein said gripping means includes a housing slidably mounting said slide element, a carriage mounted in said housing to slide alongside said slide element, and a pawl mounted to pivot on an axis in said carriage for engaging said slide element and coupling said carriage and slide element to move together in said housing.

3. Apparatus according to claim 2 wherein said slide element has at least one recess confronting said pawl, and said pawl has a nose portion extending away from the pivot axis of the pawl and toward said shift arm and has a link portion extending away from the pivot axis of the pawl and at an angle with respect to said nose portion, and said gripping means including means coupling said link portion to said shift lever, whereby pivotal movement of said shift lever displaces said coupling means and pivots said link portion of said pawl to cause said nose portion of said pawl to engage in said recess for coupling said pawl and carriage and slide so that continued pivotal movement of said shift lever in said one direction pivots said shift arm from one position to the other.

4. Apparatus according to claim 3 wherein link portion of said pawl is disposed transversely to the path of movement of said slide and said coupling means extends between said link portion and said shift lever and substantially parallel to said path of movement of said slide, and said shift lever biasing means including a spring connected to said shift lever for biasing said shift lever toward its initial position and pivoting said pawl about its axis for disengaging said recess.

5. Apparatus according to claim 3 wherein said shift arm is sequentially movable from a first position corresponding to a first forward speed range through intermediate positions corresponding to at least second and third forward speed ranges and a neutral range and movable into a reverse speed range, and wherein said slide has a series of recesses corresponding in number to said intermediate ranges, said recesses being spaced one from the other in said slide element with the recess located remote from said shift arm corresponding to said neutral range, said slide element having a substantially smooth surface extending away from the remote recess in said series and confronting said pawl, so that when said slide element displaces said shift arm into its neutral range upon sequential pivotal movement of said primary shift lever, additional pivotal movement of said primary shift lever causes the pawl to engage said surface and to slide thereon to prevent further displacement of said slide element whereby inadvertent shifting into reverse range is prevented.

6. Apparatus according to claim 3 including surface means on said pawl and said slide in said recess engageable upon rapid displacement of said primary shift lever into its terminal position to prevent disengagement of said pawl from said recess due to inertia forces on said slide element.

7. Apparatus according to claim 6 wherein said surface means includes an internal surface in said recess disposed substantially normal to the path of movement of said slide and between the nose portion and pivot axis of said pawl, and an external surface on said nose portion of said pawl matingly engaging said internal surface when said nose portion is in said recess, whereby the pawl arrests inertial movement of the slide element.

8. Apparatus according to claim 2 wherein said stop means includes a forward stop member mounted in said housing in the path of movement of said carriage for engaging said carriage and arresting movement of said carriage and slide when said shift arm is shifted into its other position.

9. Apparatus according to claim 8 wherein said stop means further includes a rearward stop member spaced from said forward member and located in the path of movement of said carriage for engaging said carriage and arresting movement of said carriage when said primary shift lever is returned by said biasing means to its initial position from its terminal position.

10. Apparatus according to claim 1 wherein said shift arm extends in opposite directions away from its pivot axis, and including means pivotally fastening said slide element connecting means to said shift arm to one side of its axis to cause said shift arm to pivot in said one direction upon displacement of said primary shift lever, a secondary shift lever associated with said primary shift lever, and connecting linkage means coupling said secondary shift lever to said shift arm on the other side of its pivot axis, so that said secondary shift lever causes said shift arm to pivot in the opposite direction for effecting changes in said speed ranges.

11. Apparatus according to claim 10 including a master shift lever associated with said primary and secondary shift levers, frame means mounting said master shift lever to pivot relative to said primary and secondary shift levers, and selector means carried by said master shift lever for selectively coupling said master shift lever with said primary and secondary shift levers so that a shifting action is effected upon displacement of said master shift lever and through a selected one of said primary and secondary shift levers.

12. Apparatus according to claim 11 wherein said shift levers are mounted to said frame to pivot and wherein said selector means includes means providing a recess in each primary and secondary shift lever remote from their pivot axes, a selector pin selectively engagable in said recesses, and means mounting said selector pin for displacement relative to said master shift lever.

13. Apparatus according to claim 12 wherein said selector pin mounting means includes bifurcations on said master lever straddling said primary and secondary levers, an elongated slot in each of said bifurcations extending outwardly from the pivot axis of said master lever for slidably receiving said selector pin, elastic means carried on said master lever and connected to said selector pin for biasing said selector pin into said recesses to couple said master lever securely to a selected one of said primary and secondary shift levers, and including an operator mounted to said master shift lever for displacing said selector pin against its bias for selectively coupling and decoupling said pin with said primary and secondary shift levers.

14. Apparatus according to claim 13 wherein said master lever and said primary and secondary shift levers are mounted to said frame to pivot on a common axis and each of said primary and secondary shift levers has an extension extending outwardly of their pivot axis to a location corresponding substantially to the outermost terminus of the slot in each bifurcation, so that when said pin is displaced into its outer limit position in the slots, the shift lever extensions cooperate to prevent the pin from being displaced beyond the primary and secondary shift levers upon pivotal movement of the master shift lever in alternate directions.

15. Apparatus according to claim 14 including means providing a companion extension on said primary shift lever a spaced lateral distance from said first-mentioned extension thereon to define therebetween said recess, said companion extension terminating radially inward of the terminus of said first-mentioned extension a distance sufficient to permit passage of said pin into said recess when engaged at the terminus of its slots, and including abutment means carried by said frame and located outwardly of the common pivot axis and in substantial registry with said companion extension when said primary shift lever is in its initial position, said abutment means being located in the path of movement of said selector means to arrest motion of said master lever and primary shift lever when returning to its initial position.

16. Apparatus according to claim 11 including means mounting said primary and secondary shift levers to pivot relative to one another and said master shift lever, said primary and secondary shift levers being angulated with respect to one another in a plane normal to their pivot axis, said frame having a series of positioning surfaces each corresponding to a different transmission range and engagable by said selector means while coupled with said secondary shift lever, said position surfaces being located outwardly of said pivot axes and intermediate said axes and said selector means, and including guard means carried by said secondary shift lever and located outwardly of said axes a distance greater than the corresponding distance of said positioning surfaces, said guard means extending toward said primary shift lever from said secondary shift lever, so that when the selector means is disengaged from the primary shift lever for engagement with the secondary shift lever, the guard means engages the selector means and prevents said selector means from engaging positioning surfaces corresponding to speed ranges other than the range into which the transmission was last shifted by the primary shift lever.

17. Apparatus according to claim 16 wherein said frame has a latch spaced from said series of index surfaces for receiving said selector means when said master lever is coupled with said secondary shift lever, said latch releasably securing said master lever in a position corresponding to a transmission locking position, and including camming means on said frame engagable by said selector means to urge said selector means into said latch upon displacement of said master shift lever in a direction toward said latch.

18. Transmission shifting apparatus, comprising a shift arm pivotable on an axis between at least two positions corresponding to different transmission output speed ranges, means for displacing said shift arm from one position to the other, including: a primary shift lever mounted to pivot between initial and terminal positions on another axis; and indexing means cooperable with said primary shift lever and said shift arm to pivot said arm in one direction from one position to the other upon pivotal movement of said primary shift lever, said indexing means including a displacement element; means connecting the displaceable element to said shift arm to cause said shift arm to pivot upon displacement of said displaceable element; gripping means connected to said shift lever and engagable with said displaceable element upon pivotal movement of said shift lever in one direction about its axis and from its initial position for displacing said displaceable element; stop means associated with said gripping means to limit displacement of said gripping means and said displaceable element engaged therewith upon continued pivotal movement of said shift lever in said one direction toward its terminal position; complementary stop means for arresting movement of said primary shift lever at its initial position when said primary shift lever is displaced in the opposite direction after effecting displacement of said shift arm, a master lever associated with said primary shift lever, frame means mounting said master lever to pivot relative to said primary shift lever, and selector means carried by said master shift lever for selectively coupling said master lever with said primary lever and uncoupling said master lever from said primary lever.

* * * * *